Figure 1:
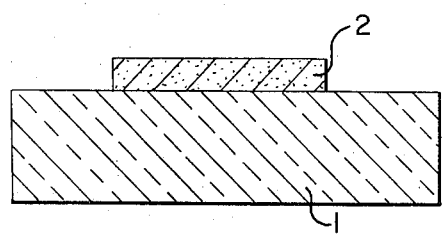

United States Patent [19]

Takagi et al.

[11] 3,776,764

[45] Dec. 4, 1973

[54] METHOD FOR SEALING GLASS, METAL OR CERAMICS WITH MIXTURE OF PBO GLASS AND β-EUCRYPTITE CONTAINING GLASS

[75] Inventors: Kiyoshi Takagi; Susumu Kawamura; Hiroshi Fujii, all of Otsu, Japan

[73] Assignee: Nippon Electric Glass Company, Limited, Tokyo, Japan

[22] Filed: Aug. 24, 1970

[21] Appl. No.: 47,580

[30] Foreign Application Priority Data
Aug. 25, 1969 Japan.................................. 44/66488

[52] U.S. Cl................ 117/124 A, 117/129, 106/49, 106/53, 117/125, 161/193, 161/196
[51] Int. Cl......... C03c 5/00, C03c 7/02, C03c 5/02
[58] Field of Search.................. 106/39 DV, 49, 53; 65/33; 117/125, 129, 124 A; 161/192, 193, 196

[56] References Cited
UNITED STATES PATENTS

| | | | |
|---|---|---|---|
| 2,393,448 | 1/1946 | Armistead......................... | 106/53 X |
| 3,211,826 | 10/1965 | Holcomb et al.................. | 106/53 X |
| 3,377,522 | 4/1968 | Tsuji et al........................... | 317/234 |
| 3,421,916 | 1/1969 | Mikoda et al....................... | 106/53 |
| 3,425,817 | 2/1969 | Ikeda et al............................ | 65/33 |
| 3,250,631 | 5/1966 | Lusher................................. | 106/53 |
| 3,258,350 | 6/1966 | Martin et al..................... | 106/47 R |
| 3,705,050 | 12/1972 | Smith................................ | 117/125 |

FOREIGN PATENTS OR APPLICATIONS

| | | | |
|---|---|---|---|
| 1,490,599 | 6/1967 | France................................ | 106/53 |

Primary Examiner—A. B. Curtis
Assistant Examiner—Mark Bell
Attorney—Kurt Kelman

[57] ABSTRACT

A sealing glass comprising a primary composition suitable as a solder, having a rapid rate of crystallization at a low temperature, a high melting point and a high coefficient of expansion, and a secondary glass composition having an extremely low coefficient of expansion crystallizing at a high temperature. The two compositions are mixed in predetermined ratio and placed under sealing heat conditions where they are caused to react to produce a third composition having a crystal which is higher in melting point and sealing resistance to reheating but which is lower in coefficient of expansion.

1 Claim, 2 Drawing Figures

PATENTED DEC 4 1973  3,776,764

METHOD FOR SEALING GLASS, METAL OR CERAMICS WITH MIXTURE OF PBO GLASS AND β-EUCRYPTITE CONTAINING GLASS

The present invention relates to glass compositions, particularly a glass sealing solder and to a method for joining objects, such as glass, metals and ceramics.

The temperature at which glass, metal or ceramic objects are sealed is restricted not only by the material itself but by the nature of the component materials associated with it. Thus, for example, the temperature at which semi-conductor packages are sealed depends upon the heat resistance of the semi-conductor; and the temperature at which cathode ray tubes are sealed depends upon the temperature at which the face deforms. In general, it has been found that most specialized items of glass, metal or ceramic objects are efficiently sealed at temperature ranges between 430° to 460°C, with only minimal concern to damage caused by excessive heat. Heretofore, somewhat satisfactory bonds have been made by employing a solder glass having the same thermal coefficient of expansion as that of the objects to be sealed and a relatively lower melting point. Devitrifying glass solder crystallizing over a long treatment period at the sealing temperature also produced satisfactory results.

The aforementioned solder glasses had certain disadvantages. For example, it is necessary to reheat cathode ray tubes (or color television tubes) to complete their evacuation, and accordingly the tubes are maintained at 390° to 420°C for periods of 5 to 10 minutes until all the air has been exhausted. At this temperature, the low melting point solders would soften and begin to flow, causing the seal previously made to weaken. Thermal devitrifying solders having the characteristic of wetting at the sealing temperature of 430° to 460°C require an inordinately long time, such as 60 to 90 minutes, to crystallize. The use of such devitrifying glass solders is therefore not efficient and results in subjecting the objects to be sealed to excessive heat treatment which may cause weakening and breaking of the sealed object.

It is accordingly the prime object of the present invention to provide a sealing material overcoming the drawbacks of the prior art.

It is another object of the present invention to provide a thermal devitrifying glass suitable as a sealing component which devitrifies rapidly and at low temperatures.

It is another object of the present invention to provide a solder glass exhibiting excellent stress characteristics and being relatively free of extraordinary sealing stresses.

It is another object of the present invention to provide a thermal devitrifying solder glass whose wettability, coefficient of expansion and other characteristics may be selectively controlled to conform to the materials to be sealed.

According to the present invention, these objects as well as others are obtained by first producing a primary sealing glass composition, which has a rapid rate of crystallization at low temperatures between 300° to 350°C, and a melting point between 400° and 460°C. While this material is suitable as a solder by itself, it has a high thermal coefficient of expansion. Accordingly, the present invention provides for the production of a secondary solder composition having an extremely low coefficient of expansion and crystallizing at a temperature above the sealing temperature (430°–460°C) which, when admixed with the primary composition and placed under sealing conditions, reacts chemically with the primary composition to produce a third devitrifying composition to produce a crystal which is higher in melting point and sealing resistance to reheating than the primary composition but which is lower in expansion coefficient.

By selecting the ratio between the primary and secondary compositions, the coefficient of expansion, and other characteristics may be obtained to conform to nearly that of any object to be sealed.

The following description fully discloses all the details of the present invention. Reference is made to the accompanying drawing in which the sealing test for determining sealing resistivity is schematically shown.

FIG. 1 is a view of the sealing solder before reaction; and

Figure 2:
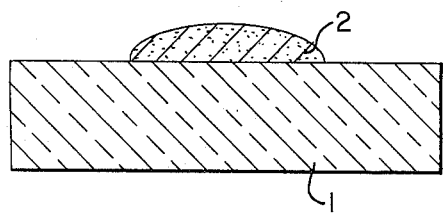

FIG. 2 a view after reaction.

The primary glass solder composition of the present invention comprises at least 98 percent, by weight, of between 68 to 77% PbO, 5 to 10% $B_2O_3$, 0 to 6% $SiO_2$, 6 to 14% $PbF_2$ and 3 to 12% $Tl_2O$. It is possible to add to the composition between 0 to 2%, by weight, of a suitable oxide which may be chosen, for example, from such as $V_2O_5$, $Sb_2O_3$ and $Al_2O_3$.

By maintaining the stated ranges of percentages by weight, the composition obtained produces a glass solder or glass composition which crystallizes rapidly between 300° to 350°C and which dissolves at a temperature below 460°C. Should any of the components PbO, $B_2O_3$, $SiO_2$, $PbF_2$ or $Tl_2O$ be admixed in proportions outside the given ranges, then the resulting composition has, by proportion, a melting point exceeding 460°C.

The composition may be obtained by heating and melting the admixed raw material at a temperature between 500° to 700°C, after which the molten material is slowly cooled until a small amount of aggregate glassy material is formed. Thereafter, the material is quickly cooled until a glassy material is produced. When a solder is to be formed, the cooled glassy material is ground into a powder to a size which would pass through a sieve of about 200 mesh. The powder may be mixed with a suitable solvent to provide a usable paste which may be easily applied to the interface surfaces of the objects to be sealed. These techniques are conventional and well known to those skilled in this art and need not be set forth in greater detail here.

A number of specific examples (lettered A-1 to A-12) of the inventive composition are set forth in the accompanying Table I, the amounts of the components being given in percent by weight. The tabulation shows the variations permitted in formulating suitable compositions and the fact that the melting point of each, in the crystallized state, ranges between 400° and 460°C. It has been found that each of the resultant compositions flows well and sufficiently wets the surface to which it is applied to become an excellent solder. The compositions may be applied to glass, metal or ceramic.

TABLE I

| material component | A-1 | A-2 | A-3 | A-4 | A-5 | A-6 |
|---|---|---|---|---|---|---|
| PbO | 70.9 | 71.8 | 76.7 | 73.4 | 70.4 | 70.4 |
| $B_2O_3$ | 8.8 | 5.8 | 6.7 | 9.2 | 8.8 | 8.8 |
| $SiO_2$ | 2.7 | 5.8 |  | 0.8 | 0.8 | 0.8 |
| $PbF_2$ | 8.8 | 8.3 | 8.3 | 13.3 | 8.0 | 12.0 |

| | | | | | | |
|---|---|---|---|---|---|---|
| Tl₂O | 8.8 | 8.3 | 8.3 | 3.3 | 12.0 | 8.0 |
| V₂O₅ | | | | | | |
| TiO₂ | | | | | | |
| Sb₂O₃ | | | | | | |
| Al₂O₃ | | | | | | |
| Total | 100 | 100 | 100 | 100 | 100 | 100 |
| melting point * | 424°C | 453°C | 443° C | 457° C | 453° C | 420° C |

| material component | A-7 | A-8 | A-9 | A-10 | A-11 | A-12 |
|---|---|---|---|---|---|---|
| PbO | 74.5 | 75.0 | 75.0 | 75.0 | 74.9 | 69.6 |
| B₂O₃ | 9.3 | 9.4 | 9.4 | 9.4 | 9.3 | 8.7 |
| SiO₂ | 0.9 | 1.0 | 1.0 | 1.0 | 2.8 | 2.6 |
| PbF₂ | 9.3 | 6.8 | 6.8 | 6.8 | 6.5 | 8.7 |
| Tl₂O | 5.9 | 6.8 | 6.8 | 6.8 | 6.5 | 8.7 |
| V₂O₅ | | 1.0 | | | | |
| TiO₂ | | | 1.0 | | | |
| Sb₂O₃ | | | | 1.0 | | |
| Al₂O₃ | | | | | | 1.7 |
| Total | 100 | 100 | 100 | 100 | 100 | 100 |
| melting point * | 438°C | 447°C | 444° C | 440° C | 432° C | 413° C |

\* melting point of crystallized material

The material produced in accordance with the present invention has a relatively high coefficient of expansion, being about $160 \times 10^{-7}/°C$. Accordingly, in order to minimize sealing stresses and strains, the composition is best used as a solder for materials having a compatible and corresponding coefficient of expansion. In this state, it is however not suitable for the large number of materials and objects to be joined which have a lower coefficient of expansion, more in the neighborhood of $90 \times 10^{-7}/°C$. It has been found that the material of the present invention can be readily modified so that its coefficient of expansion can be lowered and maintained at a controlled level suitable for use with objects having a lower range of expansion coefficients. This modification is accomplished, in accordance with the present invention by adding to this primary material the particular secondary composition, found in Japanese Patent Publications Nos. 15,320/62 and 3,912/63, for example.

The compositions shown in the aforementioned publications comprise a crystalline glass having as a nucleus a β-eucryptite crystal, and combinations of $Li_2O$, $Al_2O_3$, and $SiO_2$ as the main components, to which are added small quantities of such materials as $TiO_2$, $ZrO_2$ and $P_2O_5$. The resultant composition forms a solder or glass composition having an extremely low coefficient of expansion as low as $-5 \sim +5 \times 10^{-7}/°C$. The composition further produces a glass containing a β-eucryptite crystal which has a very high crystallization temperature.

It has been confirmed experimentally that, when the primary material of this invention is mixed with the aforementioned secondary material, in predetermined ratios, the materials react under sealing conditions to form a third crystalline composition having a higher melting point and resistance to reheating than the primary material itself and which, of course, has a lower coefficient of expansion.

Two examples (labeled $B_1$ and $B_2$) of suitable secondary compositions are shown in Table II. From each of the examples it will be seen that the compositions have a high melting point (3 to 4 times that of the primary material) and are capable of undergoing heat treatment and rise in temperature at a relatively rapid rate.

TABLE II

| B-1 component % by weight | SiO₂ 61.1 | Al₂O₃ 26.3 | Li₂O 4.7 | MgO 0.9 | P₂O₅ 1.8 |
|---|---|---|---|---|---|
| | ZrO₂ 2.3 | TiO₂ 2.1 | Na₂O 0.4 | K₂O 0.4 | Total 100.0 | melting: 1600°C 7 hr.
heat treatment: room temperature
or
700°C, 5°C/min.
700° – 910°C 1.2°C/min.
910°C    taking out

| B-2 component % by weight | SiO₂ 49.1 | Al₂O₃ 36.7 | Li₂O 8.5 | TiO₂ 5.7 | Total 100.0 |
|---|---|---|---|---|---| melting: 1500°C 5 hr.
heat treatment: room temperature
or
700°C, 5°C/min.
700° – 1000°C 1.2°C/min.
1000°C    taking out The formation of this secondary composition is fully disclosed in the aforementioned Japanese Patent Publications, which are included herein by reference.

The ratio of mixture between the primary composition (material A) and the secondary composition (material B) for most effective combination requires that the primary material be at least 75 percent by weight of the mixture, and preferably between 75 to 85 percent by weight. The mixture may contain additives, in which case the total of the primary and secondary compositions should be at least 90 percent of the total weight. Should it be desired to further control the thermal stress characteristics, its expansion coefficient or its wettability, additives selected from suitable refractory oxides such as ZnO, $Al_2O_3$, $ZrO_2$ and $SiO_2$, may be included. The total of such additives should, however, be preferably less than 10 percent of the total weight.. The particle size of the primary and secondary materials should be preferably below 150 μ.

It has been found that, if the proportion of the primary composition is below 75 percent, the flowability, during sealing, deteriorates and sealing becomes difficult. If the sum of the primary and secondary compositions is below 90 percent good sealing cannot be obtained.

The reaction process between the primary and secondary compositions is exemplified by a mixture containing 85 percent of the primary composition A-1 (Table I) and 15 percent of the secondary composition B-1 (Table II) as follows:

$5PbO·B_2O_3·SiO_2$ + β-eucryptite → β-eucryptite + $3PbO·2SiO_2$ + remaining glass If ZnO, is added this reaction becomes as follows:

$5PbO·B_2O_3·SiO_2$ + β-eucryptite + ZnO → β-eucryptite + $PbO·ZnO·SiO_2$ + remaining glass Table III lists a number of combined mixtures of primary and secondary compositions, showing the ratio of their contents, the addition of additives and the resultant condition of sealing temperature, stress, and heat resistance. Each of the combinations results in a composition having a coefficient of expansion within the range of 70 to $110 \times 10^{-7}/°C$.

The attached drawing illustrates the technique of testing the sealing characteristic of the composition. A combined mixture of primary and secondary compositions of any of the types shown in Table III is press shaped into a disc 2 of 2cm in diameter and placed on a glass plate 1, as seen in FIG. 1. The glass plate has a

TABLE III

| Number | A material | Content, percent | B material | Content, percent | Additive | Content, percent | Sealing temperature, °C | Stress | Heat resistance |
|---|---|---|---|---|---|---|---|---|---|
| 1 | A-1 | 85 | B-1 | 15 | | | 445 | 0 | Poor. |
| 2 | A-1 | 80 | B-1 | 20 | | | 445 | $T_{1120}$ | Fair. |
| 3 | A-1 | 75 | B-1 | 25 | | | 445 | $T_{2190}$ | Good. |
| 4 | A-1 | 75 | B-1 | 17 | ZnO | 8 | 445 | $T_{780}$ | Do. |
| 5 | A-1 | 80 | B-1 | 18 | $TiO_2$ | 2 | 445 | $T_{100}$ | Do. |
| 6 | A-1 | 78 | B-1 | 18 | $Al_2O_3$ | 4 | 445 | 0 | Do. |
| 7 | A-1 | 78 | B-1 | 18 | $ZrO_2$ | 4 | 445 | $T_{150}$ | Do. |
| 8 | A-1 | 80 | B-2 | 20 | | | 445 | $T_{765}$ | Do. |
| 9 | A-2 | 85 | B-1 | 15 | | | 460 | $T_{120}$ | Poor. |
| 10 | A-3 | 75 | B-1 | 25 | | | 460 | $T_{2210}$ | Good. |
| 11 | A-4 | 85 | B-1 | 15 | | | 460 | $T_{240}$ | Poor. |
| 12 | A-5 | 85 | B-1 | 15 | | | 460 | $T_{150}$ | Do. |
| 13 | A-6 | 75 | B-1 | 25 | | | 440 | $T_{1930}$ | Good. |
| 14 | A-7 | 80 | B-1 | 20 | | | 450 | $T_{1210}$ | Do. |
| 15 | A-8 | 85 | B-1 | 15 | | | 460 | $T_{310}$ | Poor. |
| 16 | A-9 | 80 | B-1 | 20 | | | 460 | $T_{1010}$ | Good. |
| 17 | A-10 | 75 | B-1 | 25 | | | 460 | $T_{1979}$ | Do. |
| 18 | A-11 | 80 | B-1 | 20 | | | 445 | $T_{930}$ | Do. |
| 19 | A-12 | 75 | B-1 | 25 | | | 430 | $T_{1900}$ | Do. | coefficient of expansion equal to $90 \times 10^{-7}$/°C, between the temperature range of 30° to 380°C. The material and glass were heated from room temperature to the sealing temperature at the rate of 8°C/min. and retained at that temperature for at least 10 minutes. Thereafter, the material and glass cooled at the rate of 3°C/min. until room temperature was reached. The material assumed the shape seen in FIG. 2. The stress was then measured by standard techniques. The material was thereafter reheated to 415°C and the resistance also investigated by standard methods.

In general, the present invention provides a simplified method for joining or sealing objects. First, a primary composition is produced, second a secondary composition is produced. The two are then mixed together in selected and predetermined ratios conforming to the objects to be sealed and applied to these objects. The objects are then placed under sealing conditions (i.e. heat) to cause the two materials to react and produce a third crystallized sealing composition in situ which binds the objects together.

As described above, the present invention provides a composition in which the expansion coefficient of sealing material can be controlled to the optimum for that of the material to be sealed. This results from being able to mix a crystal of a thermal devitrifying glass of high expansion, which rapidly crystallizes at a lower temperature than the sealing temperature and which is molten and flows below the sealing temperature, and a crystal of another thermal devitrifying glass of low expansion, which crystallizes at a higher temperature than the sealing temperature. The present invention can be applied to materials having a wide range of expansion coefficient to obtain a thermally and mechanically stable sealing composite corresponding to various objects, since, if necessary, the expansion coefficient and the thermal stress characteristic as well as wettability can be controlled by adding a refractory oxide.

Various modifications and changes are of course, possible both to the starting compositions, the ratios of mixing, the inclusion of additives and other factors. The present disclosure is therefore intended to be illustrative only and not limiting of the present invention.

What is claimed:

1. A method of sealing glass, metal or ceramic objects, said method comprising:
   a. producing a primary glass solder composition by admixing raw materials comprising at least 98 percent by weight of between 68 to 77 percent by weight PbO, 5 to 10 percent by weight $B_2O_3$, 0 to 6 percent by weight $SiO_2$, 6 to 14 percent by weight $PbF_2$, 3 to 12 percent by weight $Tl_2O$, and between 0 to 2 percent by weight of an oxide selected from the group consisting of $V_2O_5$, $TiO_2$, $Sb_2O_3$ and $Al_2O_3$, and heating the admixture to a temperature between 500° and 700°C;
   b. producing a second solder composition having a high melting and a high crystallization temperature and which is crystallized in advance, said second solder composition comprising crystalline glass solder composition comprising crystalline glass having $\beta$ - eucryptite as a nucleus crystal;
   c. mixing between 75 to 85 percent by weight of particles of said primary glass composition with 15 to 25 percent by weight of particles of said second solder composition, the resultant mixture forming at least 90 percent by weight of a composition;
   d. applying said composition of (c) on a surface to be sealed; and
   e. heating said surface to sealing temperature and thereby causing said composition of (c) to react and produce a third sealing material having a coefficient of expansion within the range of 70 to 110 $\times 10^{-7}$/°C.

* * * * *